(12) United States Patent
Hoffmann

(10) Patent No.: US 7,597,291 B2
(45) Date of Patent: Oct. 6, 2009

(54) CONNECTOR CONSTRUCTION

(75) Inventor: Armin Hoffmann, Landsberg (DE)

(73) Assignee: Hilti Aktiengesellschaft, Schaan (LI)

( * ) Notice: Subject to any disclaimer, the term of this patent is extended or adjusted under 35 U.S.C. 154(b) by 857 days.

(21) Appl. No.: 11/054,163

(22) Filed: Feb. 9, 2005

(65) Prior Publication Data

US 2005/0189456 A1    Sep. 1, 2005

(30) Foreign Application Priority Data

Feb. 9, 2004    (DE)    ........................ 10 2004 006 202

(51) Int. Cl.
*F16L 3/24*    (2006.01)
(52) U.S. Cl. ............................. 248/72; 52/698; 248/689
(58) Field of Classification Search ................... 248/72, 248/300, 200, 689; 52/698
See application file for complete search history.

(56) References Cited

U.S. PATENT DOCUMENTS

| | | | |
|---|---|---|---|
| 5,897,088 A * | 4/1999 | Kirschner | 248/300 |
| 6,393,795 B1 * | 5/2002 | Irwin et al. | 52/698 |
| 7,191,987 B2 * | 3/2007 | Heath | 248/62 |

FOREIGN PATENT DOCUMENTS

| | | |
|---|---|---|
| DE | 8804935 | 4/1988 |
| DE | 0052730 | 5/2002 |
| GB | 2225805 | 6/1990 |
| WO | 0181776 | 11/2001 |
| WO | WO03/042572 | 5/2003 |

* cited by examiner

*Primary Examiner*—Ramon O Ramirez
(74) *Attorney, Agent, or Firm*—Abelman, Frayne & Schwab

(57) ABSTRACT

An attachment construction (11) for anchoring means at a steel support (1) comprises a mounting element (12) and three U-shaped attaching elements (21) each arranged using mounting means (15) pivotly on a mounting element (12). The attaching elements (21) each have a receptacle (25) for a fixation means of the associated anchoring means. The receptacle (25) is configured as a slot-shaped aperture running over the entire U-shaped connecting element (21).

11 Claims, 5 Drawing Sheets

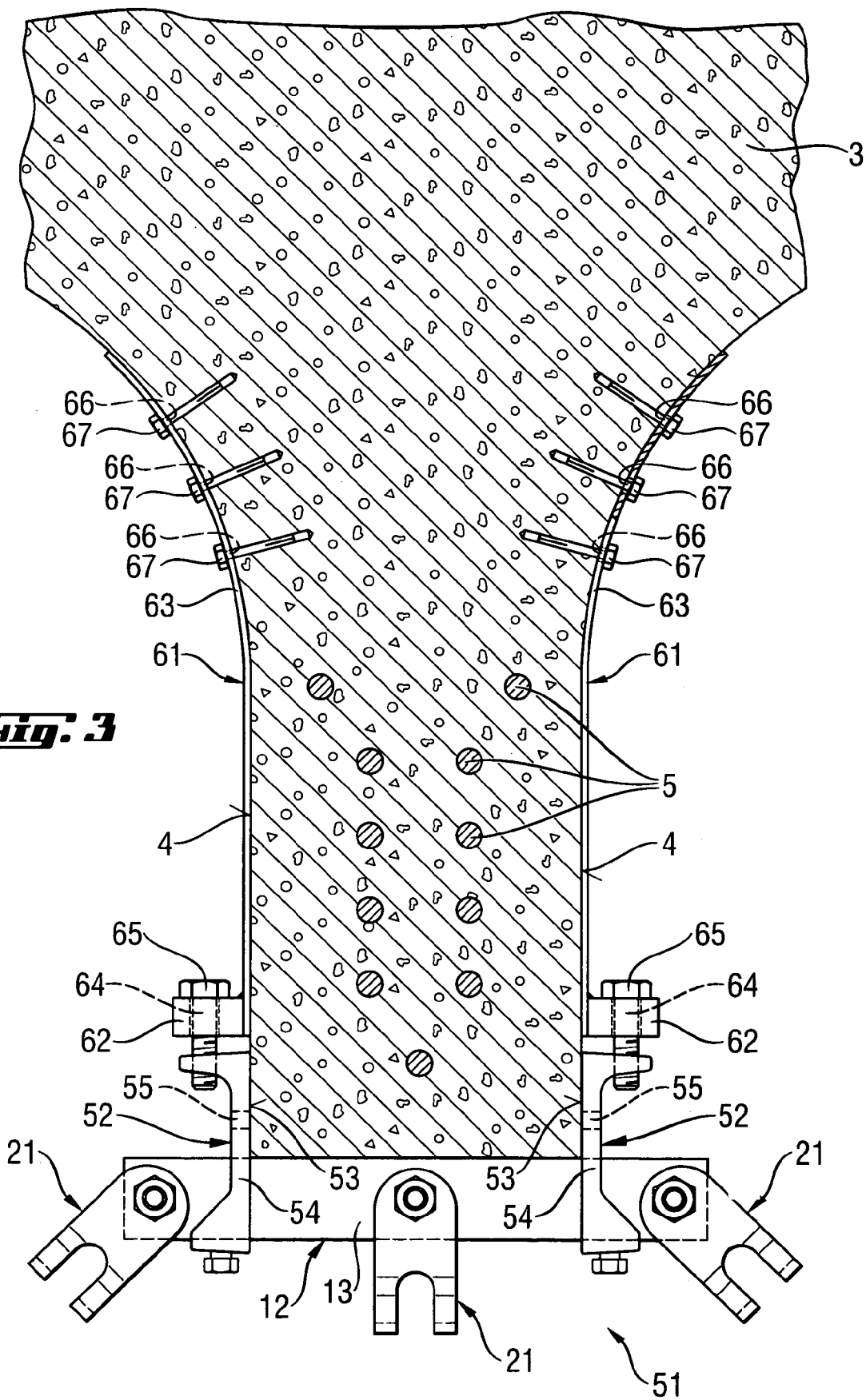

CONNECTOR CONSTRUCTION

FIELD OF THE INVENTION

The invention relates to a connector construction for a support or support construction having a bearing member and a connecting member. The connecting element has a first member and a second member as well as a connection segment connecting the first member and the second member. In the free end zones of the first member and of the second member there are passages for a pivot assembly of the connecting element to the bearing element using a bearing means. The attachment element has a receptacle for an anchoring means of the tensioning element.

BACKGROUND OF THE INVENTION

In steel and reinforced steel industrial structures, suspension constructions are frequently arranged on the supports of the support construction for creating a flexible connecting means, for example, on the required and frequently extensive structural utilities and process media such as electricity, compressed air and water. This type of suspension construction are, for example, grid ceilings, which are suspended by anchoring means on the support construction of the building, for example, on the ceiling supports of the steel or reinforced steel hall at a specific distance from same. Because of the large support intervals, the anchoring means for the suspension construction must be arranged perpendicular and diagonally from the supports relative to the grid of the suspended plane.

Large inside heights, wide support intervals and low load carrying at the roof or ceiling covering result in excessively costly and expensive solutions for affixing the anchors to the horizontal supports bearing the roof, whereby these solutions frequently cannot be used again at the time of converting the hall. In addition, mounting of this type of suspended constructions is done frequently at a great height over the floor of the hall so that the attachment devices used must be easy to handle to reduce the cost of the mounting and the risk of accidents to the personnel doing the mounting.

DE 32 24 986 A1 discloses an attachment device having threaded rods for connecting a suspended ceiling, wherein an attachment member is fastened to the ceiling, in which a rotatable articulation part is arranged. The attachment member has a receptacle for a pin of the articulation part. Furthermore, the articulation part has a receptacle for a diagonally oriented threaded rod. The threaded bolt is passed through the receptacle and is provided with an inner thread by means of a nut secured on the articulation part or the receptacle. The threaded bolt can be engaged in the inner thread.

The drawback in the known solution is the fact that this attachment device is costly to assemble. In addition, location of the securing elements is limited using the known solution. The lines of action of the forces acting on the anchoring means are off set relative to each other in this attachment construction such that the attachment construction is subject to additional transverse and torque loads and therefore must be configured massively.

DE 199 46 222 C1 discloses an attachment construction for a pipe clip having threaded rods as anchoring means to a ceiling and comprises a mounting element and two attachment elements. The attachment elements have a first member and a second member as a connection section connecting the first member and the second member. Passages for a rotatable arrangement of the attachment element to the mounting element are provided in the free end zones of the first member and of the second member using a bolt—nut connection. An elongated opening is provided on the attachment element for receiving a nut or counter nut arrangement on the threaded bolt.

The drawback in the known solution is that the attachment element is only conditionally rotatably connected with the mounting element and the second pivot range defined by the elongated opening in the attachment element makes only a minimal pivoting of the anchoring means affixed to the attachment element possible.

SUMMARY OF THE INVENTION

The object of the invention is to provide an attachment device that eliminates the aforementioned drawbacks and that can be utilized in a versatile manner.

The object of the invention is achieved in accordance with the invention by a receptacle configured as a slot-like passage running from the first member via the connecting section to the second member. The slot-like passage has bilateral, parallel running edges and defines a pivot range for the anchoring means vis-à-vis the axis formed by the mounting having a possible pivot angle in the range of 0° to 180°. The anchoring means is affixed by fixation means in the slot-like passage. Accordingly, using the attachment construction according to the invention, the anchoring means affixed to the attachment element can be pivoted in two degrees of pivot freedom. Any number of angular positions of the anchoring means relative to the support can be attained on the same attachment construction by means of the pivotable connection between the attachment element and the mounting element.

The mounting means for the pivotable fixation of the attachment element at the mounting element is a screw or a threaded bolt, for example, having a counter nut and possibly a checking washer, which can be passed through the passages on the member of the attachment element and through a passage opening in the mounting element. The passage opening in the mounting element and the passages on the members of the attachment element form mounting openings, which may have a coating or a mounting element, such as a ball bearing, for example. In lieu of a fitter's screw the mounting means can be configured as a bolt, pin or the like as well as solid or hollow bodies, which are secured using a locking pin depending on their arrangement on the attachment construction. In a variant thereof, the mounting means is configured as a slotted sleeve, which has a flange-like edge at each of the free ends of the sleeve and can be pivoted and affixed to the attachment element pivotly on the mounting element by a snap-in connection.

The attachment construction is affixed to the support in a first mounting step. The anchoring means can then be affixed to the receptacle on the attachment element by the fastening means. The anchoring means is a threaded rod, for example, which can sustain limited pressure loads along with the traction loads. In lieu of a threaded rod, smooth round rods, reinforcement rods or cables made of steel can be used as anchoring means.

Preferably, the connecting section of the attachment element connects the first member and the second member in an arcuate form. The anchoring means pivotly affixed in the receptacle of the attachment element can be guided along the arcuate configuration of the connecting section of the attachment element.

Preferably, the connection section of the attachment element has at least one linearly running section. The connecting section has a polygonal configuration, for example, comprised of a plurality of linear sections lined up with each other.

In a variant thereof, linear sections are provided between an arcuate and the members of the attachment element.

Advantageously, the mounting element is configured as a support section. The support section is a segment of a C-shaped mounting rail, for example, on which passage openings situated opposite each other are arranged for arranging the mounting means for pivotale fixation of the attachment element. Preferably, several attachment elements are provided on the support section for affixing a plurality of anchoring means to the attachment construction, wherein the support section has a corresponding number of passage openings. In the alternative, two or more attachment elements having one mounting means can be pivotly affixed in one passage opening or in passage openings situated opposite each other in the support section.

In a variant thereof, the mounting element has, for example, a contact part having two connector parts situated perpendicular to the plane formed by the contact part, wherein the connector parts each have opposing passage openings for passing through of the mounting means and the pivotable fixation of the attachment element to the mounting element. The contact part of the mounting element has a passage opening, for example, for a fastening means for fastening the mounting element to the support.

Preferably, the attachment construction has at least two retaining elements for an attachment of the mounting element to the support. Accordingly, an attachment means is created for the mounting element, which makes it possible to fasten the mounting element to the support using standardized configurations of the mounting element. When converting the attachment or re-using the attachment, the mounting element can be released from the support and re-used.

Preferably, the retaining element has a first clamp section, a second clamp section arranged opposite to the first clamp section and a connecting section connecting the two clamp sections for gripping around a support edge. At least on passage opening is provided for attaching an attachment means to at least one of the clamp sections. By virtue of the clamp-like configuration, the at least one attachment element can be easily arranged on one support, which has a flange-like section. The at least one passage opening for a fastener at least on of the clamp sections is advantageously provided with an inner thread, into which a screw having an external thread can be engaged as a fixation means. The fixation means can have a screw head or a wing nut permanently attached to the fastener as a gripping means, which can be operated manually without the use of tools.

The mounting element of the support section lies on one of the clamp sections of the retaining element and is removably attached by tightening one of the fixation means to the corresponding outside of the support. In a preferred embodiment, both clamp sections each have a passage opening for a fixation means, wherein the one fixation means serves in affixing the attachment element to the support and the other fixation means serves in affixing the mounting element. If the mounting element is configured as a C-shaped mounting rail section, a rail nut, for example, can be used as the fixation means for affixing the mounting rail section.

Advantageously, the connecting section of the retaining element has a passage opening for the passing through of the mounting element. The mounting element, for example, a support section, can have a specific longitudinal extension, which is a multiple of the corresponding extension of the width of the support, on which the mounting element rests. If the support has a smaller extension then the retaining elements are shifted for gripping around the support edge and affixed in their respective positions by fixation means. The retaining elements can be affixed by fastening means to a support having a flat outer contour without a support edge, said retaining means penetrating into the outer contour of the support, whereby the connecting section of the retaining element are positioned planarly in contact with an external side of the support. Preferably, the connecting section of the retaining element has a further passage opening for passing through of a fastening means, with which the retaining element can be fastened directly to the outside of the support.

Preferably, a retaining band or holding strip with at least one fastening section is provided on the support for the purpose of locating the mounting element or the retaining element, wherein the at least one fastening section has at least one passage opening for a fastening means. In particular, in the case of concrete supports, the large span widths, a dense arrangement of the main reinforcement is present in the lower zone of the concrete support so that fastening of the attachment construction in said zone using dowels would not be permissible or would be undesirable for static reasons. The retaining band can be laid and bonded along the outer contour of the support. The retaining band can be adapted to the widest range of support outer contours. The mounting element or the at least one retaining element is held via the one first fastening section and the fastening means passed through the passage opening, which optionally has an inner thread. The fastening means is a screw, for example, which engages in a passage opening on the mounting element or at at least one retaining element.

Advantageously, the retaining band has a second fastening section, which is provided on the end zone situated opposite to the first fastening section and has a plurality of passage openings for fastening means. In this fashion, dowels can be set outside of the tension zone and the areas of high reinforcement concentration of the concrete support.

Preferably, the fixation means of the anchoring means has a fixation receiver for arranging the anchoring means and at least two hinge sections for gripping around the edges of the slot-shaped opening of the receptacle of the attachment element. The anchoring means have a fixation assembly in a connection zone, for example. If the anchoring means are configured as threaded bars, smooth round bars or reinforcement bars, for example, their connection zone has a threaded section with an external thread, wherein the fixation means are nuts that can be arranged thereon. After introduction of this type of anchoring means, the grip-around sections are created by a nut arranged on the outside thread. A counter nut can be provided on the thread section in order to secure the anchoring means, prior to introduction. In addition, this makes it possible to affix the anchoring means in the aligned position such that the connection section of the attachment element is clamped between the nuts. In the case of cables being used as anchoring means, similarly their connection zone also has a threaded section with an outside thread and nuts that can be arranged thereon.

Preferably, the fixation means of the anchoring means has a first extension, which is smaller than the width of the passage of the receiver of the attachment element, for introducing the fixation means into the aperture of the receiver of the attachment element in a first position and a second extension, essentially running perpendicular to the first extension, which is greater than the width of the aperture of the receiver of the attachment element, for gripping behind the edges of the slot-like aperture of the receiver of the attachment element in a second position. The fixation means has a T-shaped configuration. In the first position, the fixation element that was previously arranged on the anchoring means using the fixation receptacle is introduced into the receptacle on the attachment element and then brought into a second position by an axial rotation of the anchoring or fixation means and in said second position the gripping sections grip around the edges of the slot-like receptacle on the attachment element. In addition, the fixation means and consequently the anchoring means can be deviated along the receptacle. If the anchoring means is a threaded rod or the like, the fixation means previously arranged on the anchoring means can also be introduced into the attachment element from a greater distance thereto and rotated. In this manner, assembly is facilitated substantially.

The attachment construction and its parts are advantageously made of metal, whereby the manufacturing of the parts out of cast metal is preferred. Metal and cast metal make economical manufacture of the parts possible while at the same time assuring long service life thereof. When using the attachment construction in a chemically aggressive environment, for example, the individual parts are preferably manufactured out of a corrosion—resistant material. Alternatively, one of the parts or all of the parts can be manufactured out of a suitable plastic, which has the properties required for fitness for use.

BRIEF DESCRIPTION OF THE INVENTION

Other advantageous embodiments and combinations of features of the invention will become apparent from the following detailed description with reference to the drawings, wherein:

FIG. 3 shows a section through a concrete support with an attachment construction according to the invention;

Figure 4B:
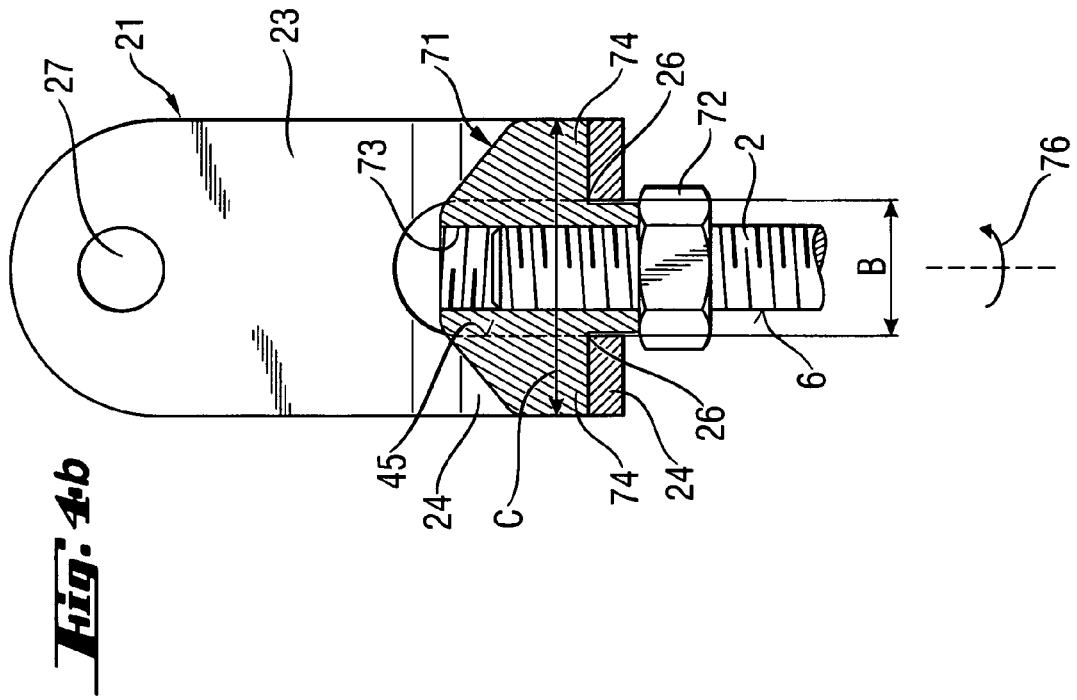
Figure 4A:
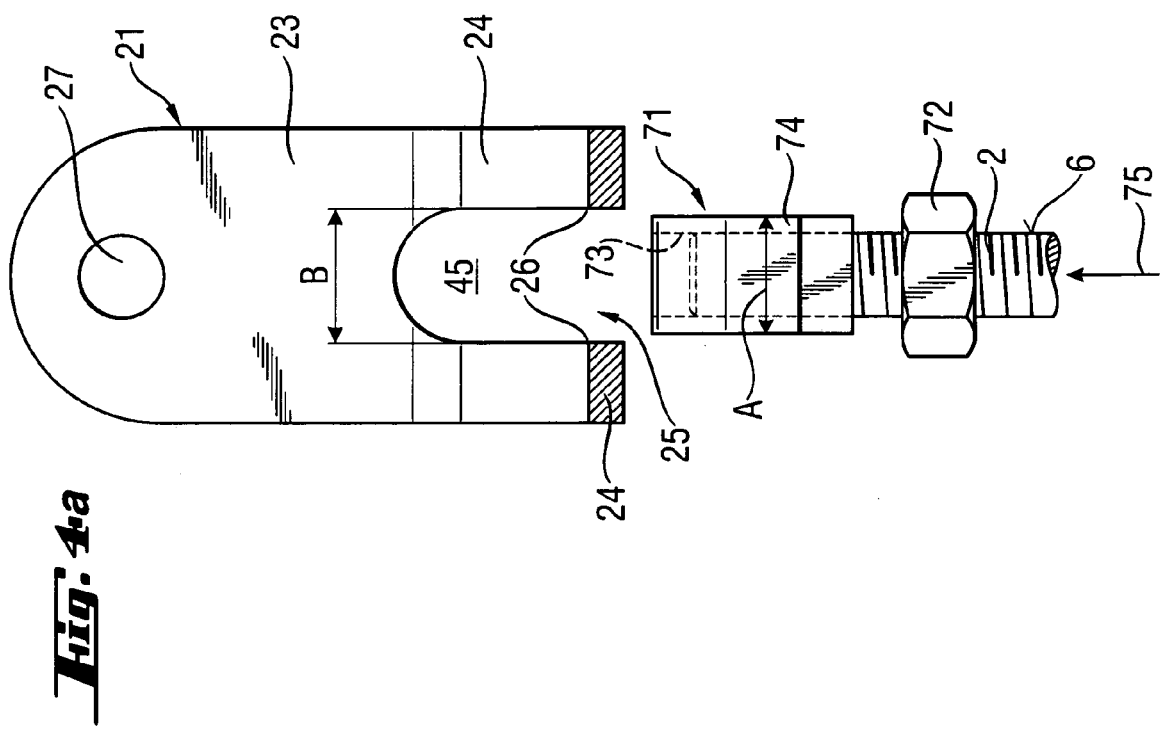

FIGS. 4a, b shows the fixation of a fixation means of an anchoring means to a connecting element in two assembly states according to the invention.

Figure 1:
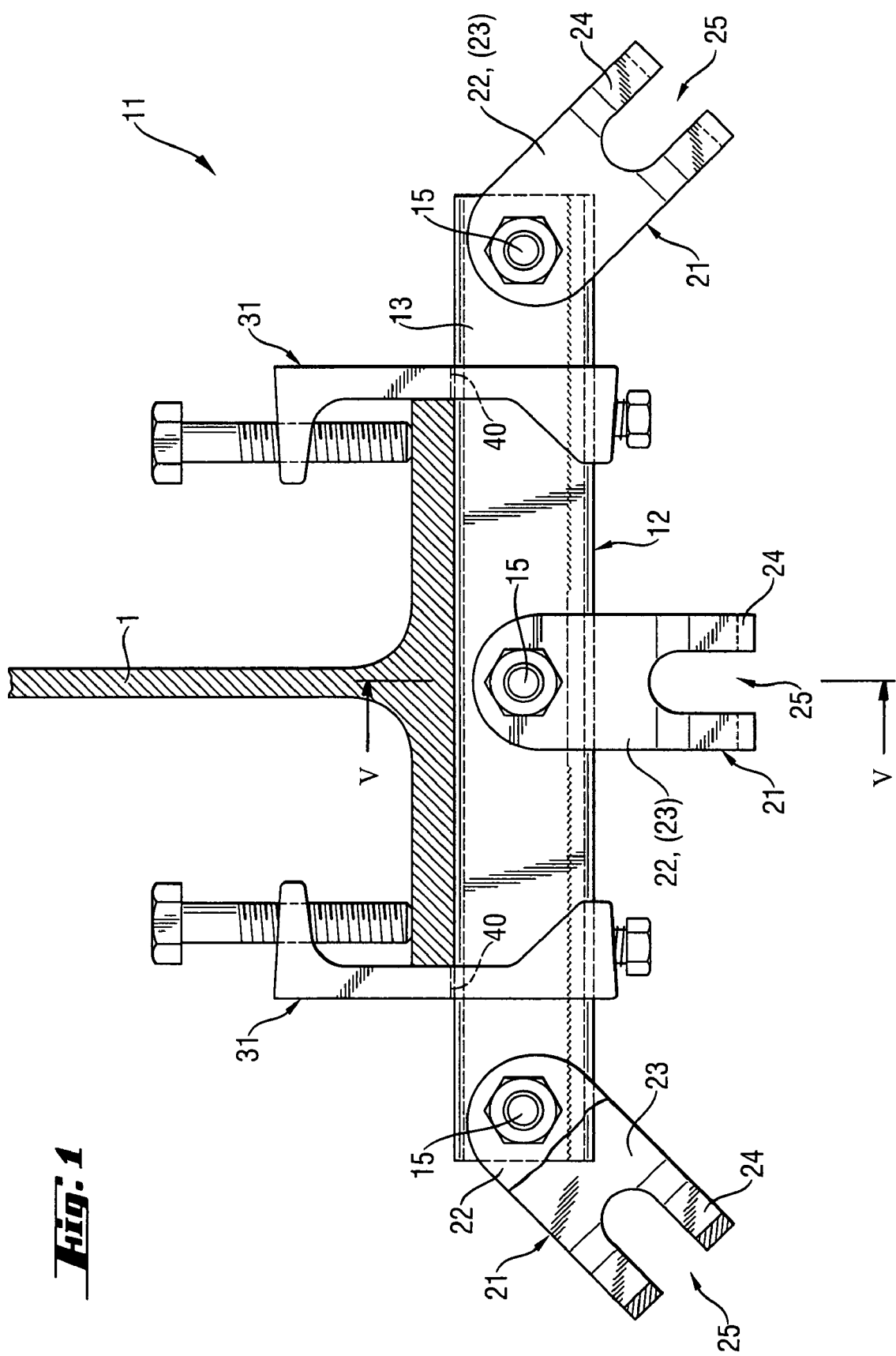
FIG. 1 shows a section through a steel support with an attachment construction according to the invention.
Figure 5:
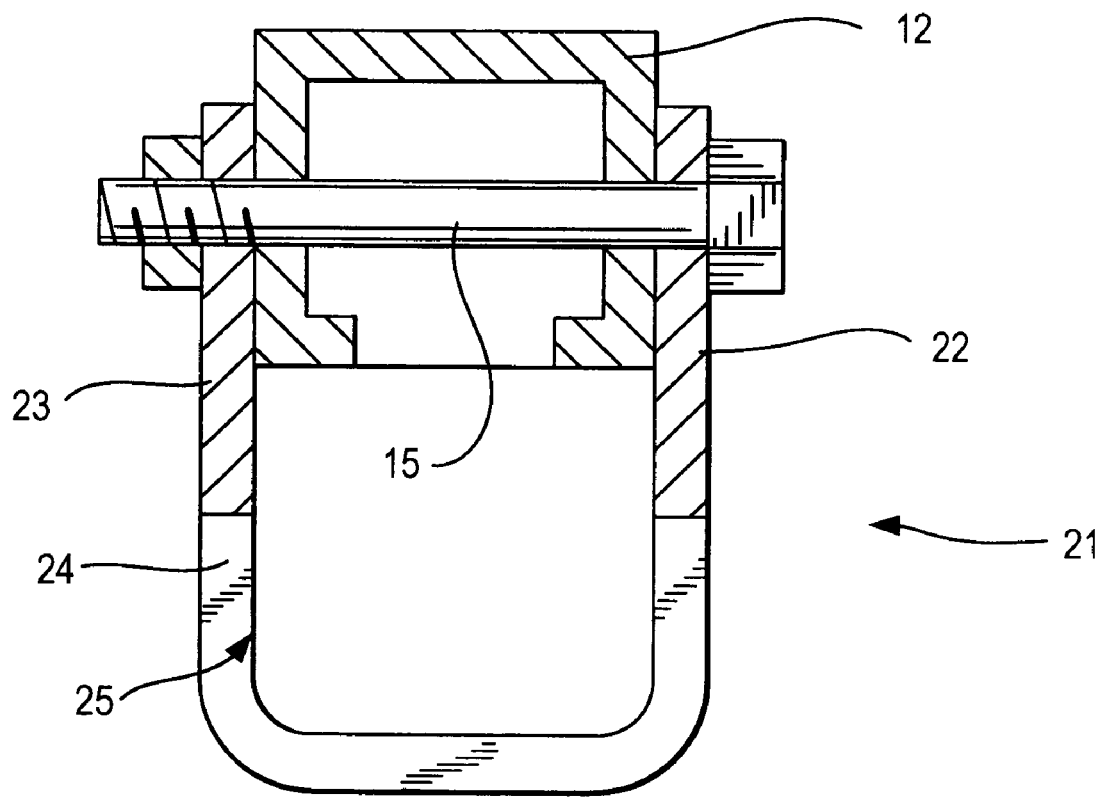

FIG. 5 shows the attachment element according to the invention in a cross-sectional view taken along line (V-V) from FIG. 1.

DETAILED DESCRIPTION OF THE INVENTION

Identical parts in the Figures are provided with the same reference numbers.

Figure 2:
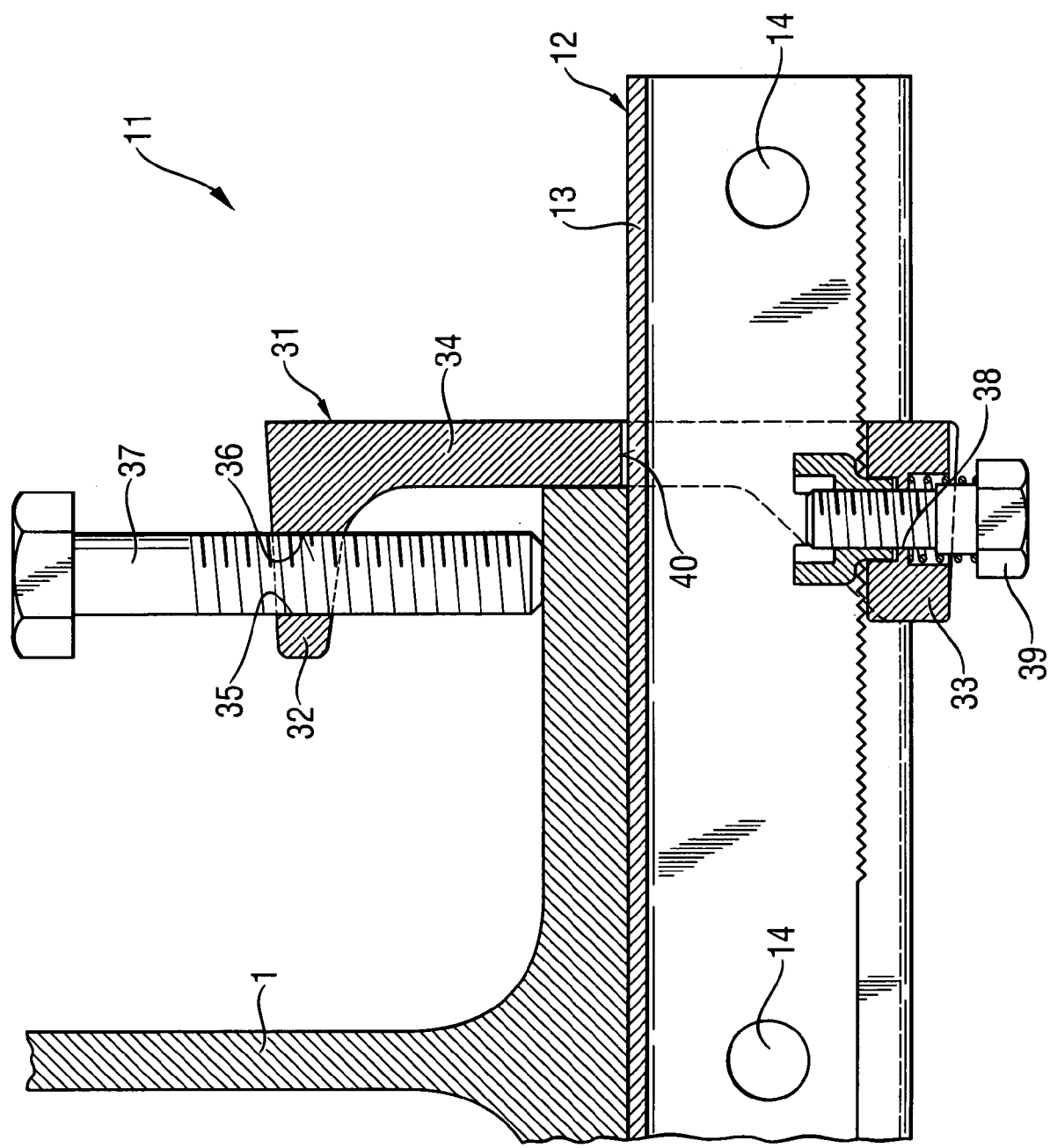
FIG. 2 shows a cut-out of the attachment construction of FIG. 1 in cross-section.

FIG. 1 and FIG. 2 show an attachment construction 11, which is affixed to a steel support for the arrangement of three different anchoring means (e.g. anchoring means 2 in FIG. 4a, 4b) for a suspended construction or the like. The attachment construction 11 has a support section 13 configured as a mounting element 12, wherein the support section 13 is a section of a C-shaped mounting rail. Three opposite arranged pairs of passage openings 14 (FIG. 2) for a mounting means 15 in the form of a bolt are provided on the support section 13. The attachment elements 21 are pivotally arranged on the support section 13 by mounting means 15.

The attachment elements 21 each have a cross-section configured in a U-shape having a first member 22, a second member 23 situated opposite to the first member 22 and a connection section 24 joining the first member 22 and the second member 23, which runs arcuately with linear sections. An aperture 27 (FIG. 4a, 4b) is provided at the free end zones of the first member 22 and of the second member 23. In addition, the attachment elements 21 each have a receptacle 25 for a fixation means 71 of the anchoring means 2, which are configured as slot-shaped apertures running from the first member 22 via the connecting section 24 to the second member 23.

The attachment construction 11 further comprises two retaining elements 31 for retaining the support section 13 on the steel support 1. Each retaining element 31 has a first clamp section 32, a second clamp section 33 and a connecting section 34, connecting the first clamp section 32 and the second clamp section 33, for gripping around an edge of the support. A passage opening 38 for a rail nut configured as a fixation means 39 for affixing the support section 13 is provided at the second clamp section 33. The screw and the rail nut can be arranged at the factory on the retaining element 31 or at the construction site on the retaining element 31.

A passage opening 40 is provided on the connecting segment 34 of the retaining element 31 for the support section 13 configured as the mounting element 12, so that the retaining elements 31 can hold the support section 13 at different distances from one another. The entire attachment construction 11 can be pre-mounted or assembled from the individual parts prior to mounting and arranged as a set on the steel support 1. The retaining elements 31 are pushed away from each other such that each of the first clamp sections 32 can be guided over the edge of the steel support 1. Then the retaining elements 31 are moved against each other until they abut on the edge of the steel support 1, whereby the attachment construction 11 is temporarily held on the support. The support section 13 is aligned and removably affixed on the retaining element 31 by the fixation means 39 on the second clamp section 33. By tightening the fixation means 37 on the first clamp section 32, the fastening construction 11 is removably affixed on the steel support.

The attachment construction 51 represented in FIG. 3 is arranged on a concrete support 3 and comprises the same parts as the attachment construction 11. The retaining elements 52 of the attachment construction 51 are oriented on opposite sides to the retaining elements 31 of the attachment construction 11 so that one of each contact surface 53 can abut on the outside 4 of the concrete support 3. In addition, the retaining elements 52 each have an additional passage opening 55 for a fastening means, in their connecting section 54, for creating a direct attachment (not shown) of the retaining element 5 to the concrete support 3.

In addition, the attachment construction 51 has two retaining bands 61, each with a first fastening section 62 and a second fastening section 63. The first fastening section 62 is oriented perpendicular to the plane formed by the retaining band 61 and has a passage opening 64 for a screw configured as a fastening means 65, which engages in the passage opening on the first clamp section of the retaining element 52. The second fastening section 63 of the retaining band 61 has three passage openings 66 for screws configured as fastening means 67, which engage in dowels previously let in the concrete support 3. The main reinforcement 5 is not damaged by any fastening means 67.

As shown in FIGS. 4a and 4b, the anchoring means 2 configured as a threaded rod has an external thread 6, onto which a counter nut 72 can be threaded on and over the fixation receptacle 73 of the fixation means 71. The fixation means 71 comprises two grip-around sections 74 for gripping around the edges 26 of the receptacle 25 of the attachment element 21. The fixation means 71 has a first dimension A, which is smaller than the width B of the aperture 45 of the receptacle 25 of the attachment element 21. The fixation means 71 has a second dimension C, which is greater than the width B of the aperture of the receptacle 25 of the attachment element 21. The fixation means 71 is introduced into the receptacle 25 of the attachment element 21, in the direction of the arrow 75, into the first position (shown in FIG. 4a) and by rotating of the fixation means 71, in the direction of the arrow 76, brought into the second position (shown in FIG. 4b), in which the grip-around sections 74 grip around the edges 26.

FIG. 5 shows the attachment element according to the invention in a cross-sectional view taken along line (V-V) from FIG. 1. The attachment element 21 has a cross-section configured in a U-shape. The first and second members 22, 23 are joined or connected on one end, respectively, by a connection section 24. At the free end zones of the first member 22 and of the second member 23, an aperture 27 (shown in FIGS. 4a, 4b) for a bolt as mounting means 15 is provided so that the attachment element 21 is pivotally arrangeable on the support section 13 (shown in FIG. 1).

What is claimed is:

1. An attachment construction for joining an anchoring means (2) to a support (1, 3) of a support construction, the attachment construction comprising:
    a mounting element (12);
    an attaching element (21), wherein the attaching element (21) has:
        a first member (22),
        a second member (23),
        a connecting section (24) connecting the first member (22) with the second member (23), wherein the first member (22) and the second member (23) each have free end zones having apertures (27) for a pivotable arrangement of the attaching element (21) to the mounting element (12) using a mounting means (15), and
        a receptacle (25) for a fixation means (71) of the anchoring means (2), and formed as a slot-shaped aperture extending from the first member (22) to the second member (23) via the connecting section (24); and
    at least two retaining elements (31; 52) for attaching of the mounting element (12) to the support (1; 3).

2. The attachment construction of claim 1, wherein the connecting section (24) arcuately connects the first member (22) and the second member (23).

3. The attachment construction of claim 1, wherein the connecting section (24) of the attaching element (21) has at least one linearly running section.

4. The attachment construction of claim 1, wherein the mounting element (12) is a support section (13).

5. The attachment construction of claim 4, wherein a plurality of attaching elements (21) are provided on the support section (13) for affixing a plurality of anchoring means (3) to the attachment construction (11; 51).

6. The attachment construction of claim 1, wherein the retaining element (31; 52) has a first clamp section (32), a second clamp section (33) arranged opposite to the first clamp section (32) and a connecting section (34) connecting the two clamp sections (32, 33) for gripping around an edge of the support (1; 3), wherein at least one passage opening (35, 40) is provided for a fixation means (37, 39) at least one of the clamp sections (32, 33).

7. The attachment construction of claim 1, wherein the connecting section (34) of the retaining element (31; 52) has a passage opening (40) for passing through of a mounting element (12) and another passage opening (55) for a fastening means.

8. The attachment construction of claim 7, wherein the connecting section (34) of the retaining element (31; 52) has another passage opening (55) for a fastening means.

9. The attachment construction of claim 1, wherein a retaining band (61) is provided with at least one fastening section (62, 63) for affixing one of the mounting element (12) and the retaining element (31; 52) to the support (3), wherein the at least one fastening section (62, 63) has at least one passage opening (64, 66) for a fastening means (65, 67).

10. The fastening construction of claim 1, wherein the fixation means (71) of the anchoring means (2) has a fixing receiving part (73) for arranging the anchoring means (2) and at least two gripping sections (74) for gripping around edges (26) of the slot-shaped aperture of the receptacle (25) of the fastening element (21).

11. The attachment construction of claim 1, wherein the fixation means (71) of the anchoring means (2) has a first dimension (A) that is smaller than the width (B) of the aperture of the receptacle (25) of the fastening element (21) for introducing the fixation means (71) into the aperture of the receptacle (25) of the fastening element (21), in a first position, and a second dimension (C) running perpendicular to the first dimension (A), which is larger than the width (B) of the aperture of the receptacle (25) of the attaching element (21), for gripping around the edges (26) of the slot-shaped aperture of the receptacle (25) of the attaching element (21) in a second position.

* * * * *

UNITED STATES PATENT AND TRADEMARK OFFICE
CERTIFICATE OF CORRECTION

PATENT NO.      : 7,597,291 B2
APPLICATION NO. : 11/054163
DATED           : October 6, 2009
INVENTOR(S)     : Armin Hoffmann It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1276 days.

Signed and Sealed this

Twenty-eighth Day of September, 2010

David J. Kappos
*Director of the United States Patent and Trademark Office*